No. 652,146. Patented June 19, 1900.
H. SPÜHL.
WELDING SWAGE FOR CHAIN LINKS.
(Application filed July 15, 1899.)
(No Model.)

Witnesses:
Emil Kayser.
Bernhard Hesse.

Inventor
Heinrich Spühl.
by Albert Keßler
Attorney.

UNITED STATES PATENT OFFICE.

HEINRICH SPÜHL, OF ST. GALL, SWITZERLAND, ASSIGNOR TO THE MASCHINENFABRIK ST. GEORGEN BEI ST. GALLEN GOTTFR. V. SÜSSKIND, OF ST. GEORGEN, SWITZERLAND.

WELDING-SWAGE FOR CHAIN-LINKS.

SPECIFICATION forming part of Letters Patent No. 652,146, dated June 19, 1900.

Application filed July 15, 1899. Serial No. 723,962. (No model.)

*To all whom it may concern:*

Be it known that I, HEINRICH SPÜHL, a citizen of the Confederation of Switzerland, residing at St. Gall, Switzerland, have invented a new and Improved Welding-Swage for Chain-Links, of which the following is an exact specification.

The present invention relates to an improvement in welding-swages for chain-links, by means of which my chain-welding machine, forming the object of my Letters Patent No. 619,850, can be employed for welding the chain-links at their curved parts, while in the aforecited application the links only could be welded at the sides. In the aforecited machine the swage is provided with a cam for the purpose of adjusting the ends of the link before the welding. Further arrangements are made that the chain, being in welding heat, cannot come into contact with its swage, thus the premature cooling of the heated ends of the links being prevented.

In order to attain the purpose of welding the links at their curved parts, use of a swage of special form is made.

The object of my invention is clearly represented in the accompanying drawings, in which—

Figure 1:
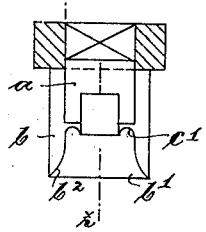
Figure 2:
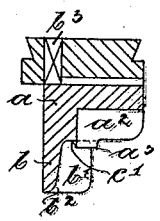
Figure 3:
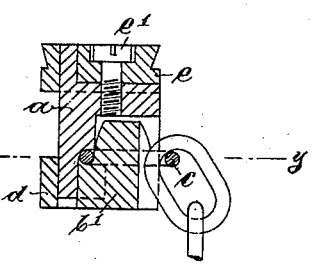
Figure 4:
Figure 5:
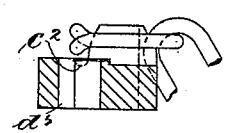
Figure 6:
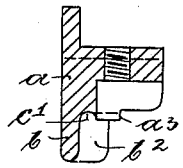
Figure 7:
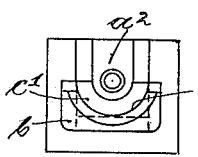
Figure 8:
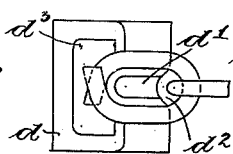
Figure 9:
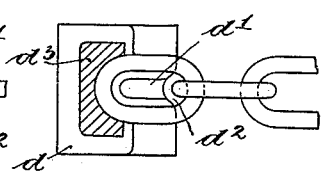
Figure 10:
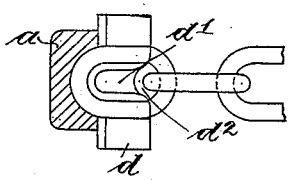
Figure 11:
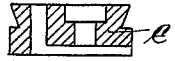

Figure 1 illustrates a front view of the upper swage. Fig. 2 is a section through $z\,z$ of Fig. 1. Fig. 3 is a section through the upper and lower swage during the welding process. Fig. 4 is a detail front view of the lower swage. Fig. 5 is a section through the lower swage supporting a chain-link to be welded. Fig. 6 is a section through the middle portion of the upper swage. Fig. 7 is a back view of the upper swage. Fig. 8 is a top view of the lower swage, with a chain-link. Fig. 9 is a horizontal section through $y\,y$ of Fig. 3, showing the disposition of the chain. Fig. 10 is a corresponding view of a modified construction of the lower swage. Fig. 11 illustrates a plate by means of which the upper swage is fixed to the hammer-head.

The upper swage $a$, Figs. 1, 2, 3, 6, and 7, is provided with a cam $b$, having a curved surface $b'$ in form corresponding to the curve of the chain-links, (in the example represented being semicircular.) The surface has a board $b^2$, tapered to the outside. A prismatic projection $b^3$ engages into a groove provided within a plate $e$, fixed in the hammer-head. The upper swage $a$ is provided with a recess $a^2$, the board of which, $a^3$, corresponds to the form of the chain-link to be welded—that is to say, semicircular at the point of welding—whereas the remaining portion is of a flat shape, Fig. 7. The semicircular part of the board $a^3$ forms a round swage $c'$, and the flat portion insures that only the place of weld can be hit by the hammer.

The lower swage $d$, Figs. 4, 5, 8, and 9, is provided with a recess $d^3$, corresponding in form and size to the section of the cam $b$ of the upper swage, Fig. 8. The lower swage has a semicircular swage $c^2$, corresponding in form to the upper swage. Furthermore, the lower swage is provided with a bolt $d'$, in form corresponding to the inner space of the chain-link $c$. This bolt $d'$ at its front side is provided with a groove $d^2$, taking up the last welded chain-link. The bolt $d'$ is conical and takes up the link to be welded, and owing to its conical form prevents the link from coming into contact with the swage before the blow is effected.

The welding of links is effected in the following manner: The U-shaped link after having received its shape (illustrated in Figs. 5 and 8) is laid into the groove $d^2$. The place of weld comes to lie upon the round swage. When now the hammer-head, with the upper swage $a$, descends, the cam $b$ enters the recess $d^3$ of the lower swage, and owing to its semicircular surface $b^2$ presses the ends to be welded of the link $c$ against the bolt $d$, so that these ends come to lie exactly one above the other. The upper round swage $c'$ effects the blow upon the ends of the links, whereby the same are welded and adopt the form of the round swages. The inner curved surface of the cam secures the right position of the ends to be welded and prevents the premature cooling of the same. The upper swage $a$ easily can be interchanged by means of the plate $e$.

Having thus fully described the nature of this invention, what I desire to secure by Letters Patent of the United States is—

In a chain-welding machine, the combination of an upper and a lower swage, the first being provided with a curved part or cam corresponding to the curve of the chain-links to be welded, the second swage being provided with a recess of a form corresponding to the form of the cam and a stretcher adapted to hold the chain-links with their heated ends overtopping the same, thus preventing them from touching any other parts before the blow and from getting cooled, substantially as set forth.

In witness whereof I have hereunto set my hand in presence of two witnesses.

HEINRICH SPÜHL.

Witnesses:
   JUAN BARTHOLET,
   HANS KOLLER.